No. 631,817.
L. D. RAILSBACK.
ICE CREAM FREEZER.
(Application filed Mar. 30, 1898.)
(No Model.)
Patented Aug. 29, 1899.
2 Sheets—Sheet 1.
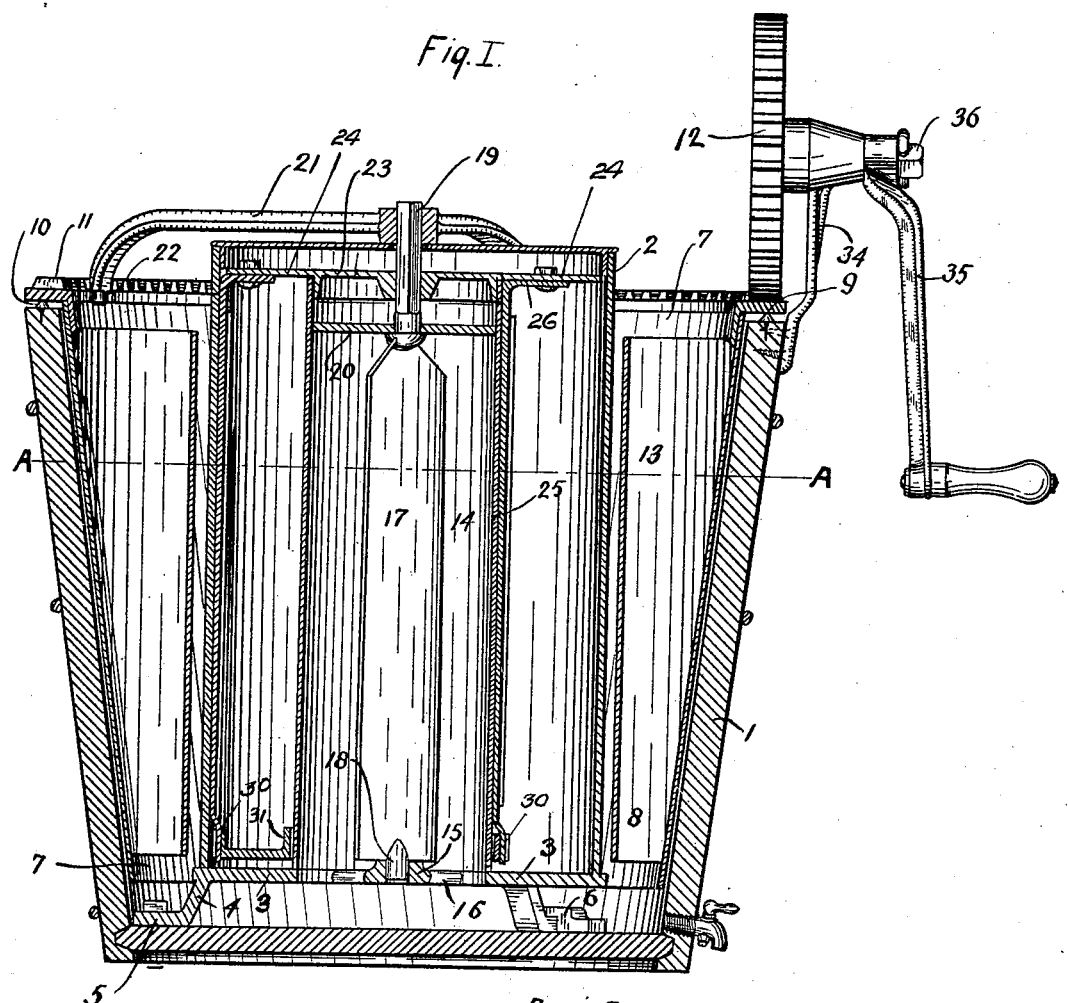
Fig. I.
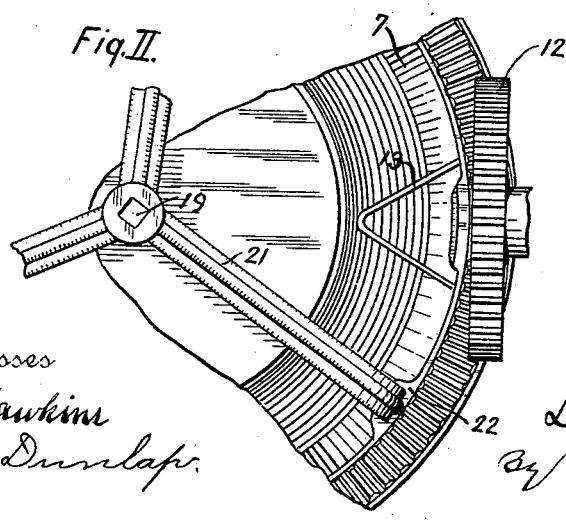
Fig. II.
Witnesses
R. O. Hawkins
Kate Dunlap.
Inventor
Lafayette D. Railsback
By V. H. Lockwood
His Attorney.

No. 631,817. Patented Aug. 29, 1899.
L. D. RAILSBACK.
ICE CREAM FREEZER.
(Application filed Mar. 30, 1898.)
(No Model.) 2 Sheets—Sheet 2.
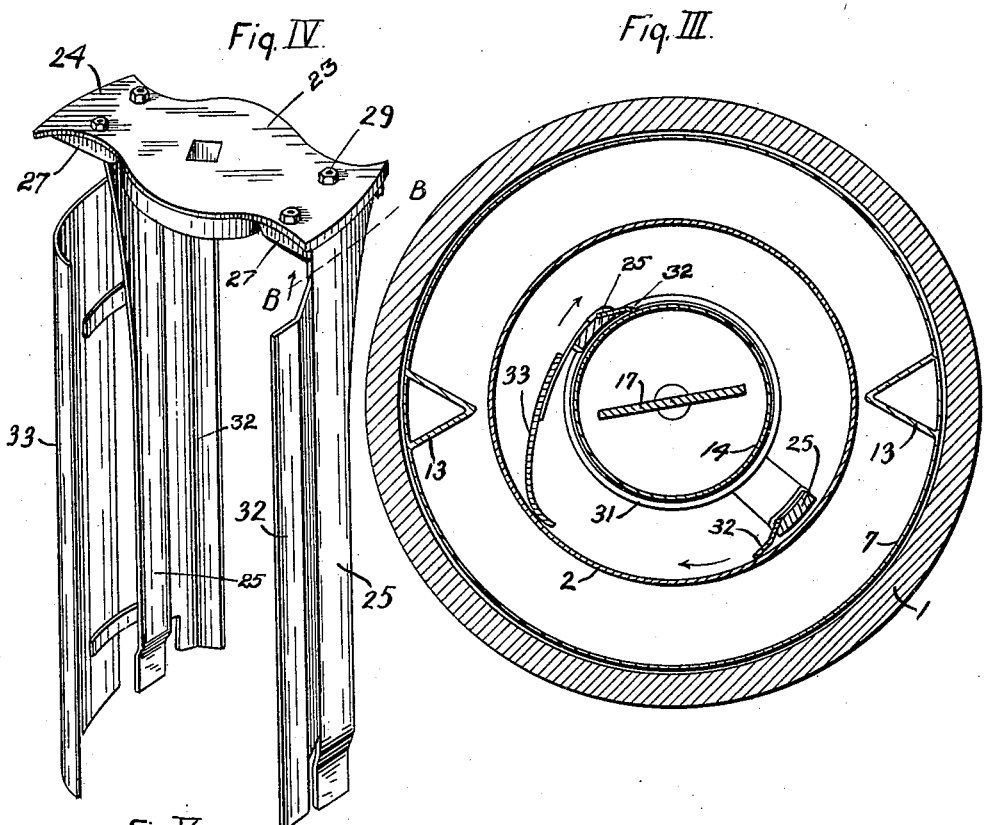
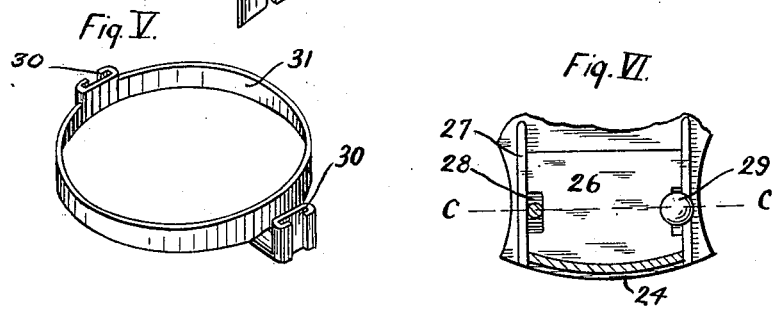
Witnesses
R. D. Hawkins
Kate Dunlap
Inventor
Lafayette D. Railsback
By V. H. Lockwood
His Attorney.

UNITED STATES PATENT OFFICE.

LAFAYETTE D. RAILSBACK, OF INDIANAPOLIS, INDIANA.

ICE-CREAM FREEZER.

SPECIFICATION forming part of Letters Patent No. 631,817, dated August 29, 1899.

Application filed March 30, 1898. Serial No. 675,739. (No model.)

*To all whom it may concern:*

Be it known that I, LAFAYETTE D. RAILSBACK, of Indianapolis, county of Marion, and State of Indiana, have invented a certain new and useful Ice-Cream Freezer; and I do hereby declare that the following is a full, clear, and exact description thereof, reference being had to the accompanying drawings, in which like figures refer to like parts.

My invention relates to certain improvements in ice-cream freezers wherein the cream-can contains a body of ice or freezing material extending centrally through it as well as another body of ice or freezing material surrounding the cream-can. The improvements herein referred to relate chiefly to the means for operating the freezer, and more especially to the arrangement of the scraper and mixer.

The full nature of my invention will be understood from the following description and claims.

In the drawings, Figure I is a central vertical section of my said ice-cream freezer. Fig. II is a plan view of a portion. Fig. III is a horizontal section on the line A A, Fig. I. Fig. IV is a perspective of the scraper and mixer mechanism. Fig. V is a perspective of the means for holding the lower ends of the mixer and scraper in place. Fig. VI is a section and bottom view at the line B B of Fig. IV, looking upward. Fig. VII is a section on the line C C, Fig. VI.

In detail, 1 is a wooden pail of a familiar type. A hollow cream-can 2 is centrally mounted within said pail, its annular bottom 3 being provided with legs 4, formed with horizontal feet 5 in order that they may be secured to the bottom of the pail by the pivoted holding devices 6. This enables one to quickly remove the cream-can from the pail. Outside the cream-can a movable lining 7 of metal is provided for the pail. The upper end of said movable lining 7 is outwardly flanged at 9, said flange overlapping the upper end of the pail and resting upon supporting heads or pins 10, secured to the pail. Said flange is provided with a series of teeth 11 on its upper surface, thus forming a gear or annular rack that meshes with a gear 12, whose spindle 36 is mounted in the bracket 34 and is secured to the side of the pail. A crank 35 is secured to the spindle 36, and by this mechanism the movable lining referred to is rotated. The space between the lining and the cream-can is to be filled with ice. To move the ice around the cream-can and rub it against the can, I secure to the lining vertical ribs 13, preferably triangular in cross-section and extending rather close to the cream-can. To agitate and distribute the ice in the center of the ice-chamber, I place a revolving paddle 17, that has a round pin 18 extending from its lower end, into a round seat in the upper end of the post 15, carried on the arms 16. A shank or extension 19 extends upward from such saddle through a round hole in the cross-bar 20. The upper portion of said shank is angular and fits in a similarly-shaped aperture in the center of the frame 21. This frame consists of three arms diverging horizontally from the center and their outer ends curve downward and form points to enter sockets or notches 22, formed in the revolving or movable lining 7. By this means said frame 21, as well as the paddle 17, will be caused to revolve.

The means for mounting the scraper and worker are as follows: The lid 23 of the central ice-chamber is provided with a central angular aperture to fit over the angular portion of the shank 19, and it also has two opposite extensions 24. These extensions and the lid are in the form of a plate, as seen in Fig. IV, with a depending rim or flange to fit snugly in the upper end of the central ice-chamber. A pair of downwardly-extending arms 25 are adjustably secured to the under side of said extensions, as seen in Figs. IV and VI. Each arm at its upper end is provided with a horizontal flange 26, that slips between guideways 27 beneath said extensions 24. Notches or recesses 28 are cut in the sides of such flange 26, through which bolts 29 extend, whereby the flange 26 is clamped in any set position to the extension 24. The purpose of this is to adjust the contact of the scrapers. Said arms are curved in cross-section and are held in place at their lower ends by the sockets 30, secured to a band 31, which surrounds the lower end of the inner wall 14 of the cream-can. I secure to each of said arms 25 a scraper 32, that is welded or otherwise fastened to such arms. One arm 26 is secured to the outer end of one extension 24, so that the scraper carried by it will engage the outer wall of the cream-can, while the other arm is so located on its extension 24 as to enable its scraper to engage the inner wall of the cream-can, as seen in Fig. III. Cream as it freezes adheres to said walls and must be scraped off. So by this arrangement a double freezing is constantly in progress. The arms 25 are preferably made of cast metal, while the scrapers are preferably made of sheet metal or tin. To the arm 25, which carries the scraper that engages the inner wall 14 of the cream-can, I secure a worker 33, formed substantially as shown in Figs. III and IV, which stirs and works the cream and at the same time presses the freezing cream against the outer wall of the cream-can so that it mashes any lumps and otherwise makes the cream fine.

The central ice-chamber is the hollow or space within the inner wall of the cream-can and is entirely open at the bottom, so said chamber communicates with the outer ice-chamber by reason of the space below the cream-can. In this manner the refrigerating material has free circulation within the annular cream-can, around it, and beneath it. Said ice-chamber is closed at its upper end by the lid 23. (To be seen in Fig. IV.)

From this description it is seen that by rotating the crank 15 the ice around the cream-can will be constantly carried about it and rubbed against it. Also the paddle 17 will constantly agitate the ice in the central ice-chamber, while the workers and the scrapers shown in Fig. IV will be constantly moved in the directions indicated by the arrow in Fig. III through the freezing cream. The outer and inner ice-chambers are connected, so there will be a constant circulation of ice from the outer chamber into the inner chamber, and a uniform temperature will result, which will have a uniform freezing effect on all parts of the cream-can. By this the difficulty of freezing much faster at one point than another to interfere with the uniform operation of the scrapers will be avoided. Also the water from all ice-chambers can be drawn off at a faucet in the pail when desired, and ice can be added in the ice-chambers after the cream is frozen for preserving it. To this end it is important to have the central ice-chamber open at its upper end or so it can be opened for the insertion of ice.

What I claim as my invention, and desire to secure by Letters Patent, is—

1. An ice-cream freezer including an outer ice-receptacle, a hollow annular cream-can mounted within said receptacle above its bottom to leave an ice-receptacle below said cream-can, and an inner ice-receptacle formed by the hollow of the cream-can and having no bottom, whereby the space about, beneath and within the hollow of the cream-can forms practically a single ice-chamber, and means for forcing the ice from the outer to the inner receptacle.

2. An ice-cream freezer including a stationary cream-can, a revoluble plate or support at the upper end of the cream-can, a loosely-mounted band at the lower end of the cream-can provided with a socket, an arm secured to the plate or support above and extending down and detachably entering the socket in said band, and a scraper or worker secured to such arm.

3. An ice-cream freezer including a stationary cream-can, an ice-chamber about the cream-can, an ice-chamber within the cream-can, a rotatable plate or support at the upper end of the cream-can, radially-adjustable arms extending downward from each end of said plate or support, a band provided with sockets detachably engaged by said arms, a scraper on each of said arms, said arms being so located that the scraper on one arm will engage the outer wall of the cream-can, and the other will engage the inner wall thereof.

4. An ice-cream freezer including a stationary hollow cream-can, ice-chambers surrounding and within the hollow of the cream-can, a rotatable plate or support at the upper end of the cream-can, a band loosely surrounding the inner wall of the cream-can having sockets in it, a pair of arms secured to the plate or support and extending down into said sockets and detachable therefrom, a scraper secured to said arms, one arm being attached to the plate or support at such point as to cause its scraper to engage the outer wall of the cream-can, and the other arm being so located as to cause its scraper to engage the inner wall of the cream-can.

5. An ice-cream freezer including a suitable vessel, a stationary hollow cream-can centrally secured therein, a lining for said vessel that is movable and has a toothed outwardly-extending annular flange that rests upon the upper edge of said vessel, a bracket secured to the side of said vessel, a gear carried in said bracket that meshes with and drives the rack on said lining, a frame extending across the upper end of the freezer secured to said lining, means within the ice-chamber within the cream-can for agitating the ice therein, a plate or support at the upper end of the cream-can for carrying suitable scrapers and workers, means for detachably connecting said frame, the plate or support for the scrapers and workers and the means for agitating the ice in the central ice-chamber so that they will all rotate together.

In witness whereof I have hereunto set my hand this 16th day of February, 1898.

LAFAYETTE D. RAILSBACK.

Witnesses:
V. H. LOCKWOOD,
R. D. HAWKINS.